I. BAUMGARTNER.
AUTOMATIC DRINKING FOUNTAIN.
APPLICATION FILED FEB. 24, 1909.
937,042.
Patented Oct. 19, 1909.
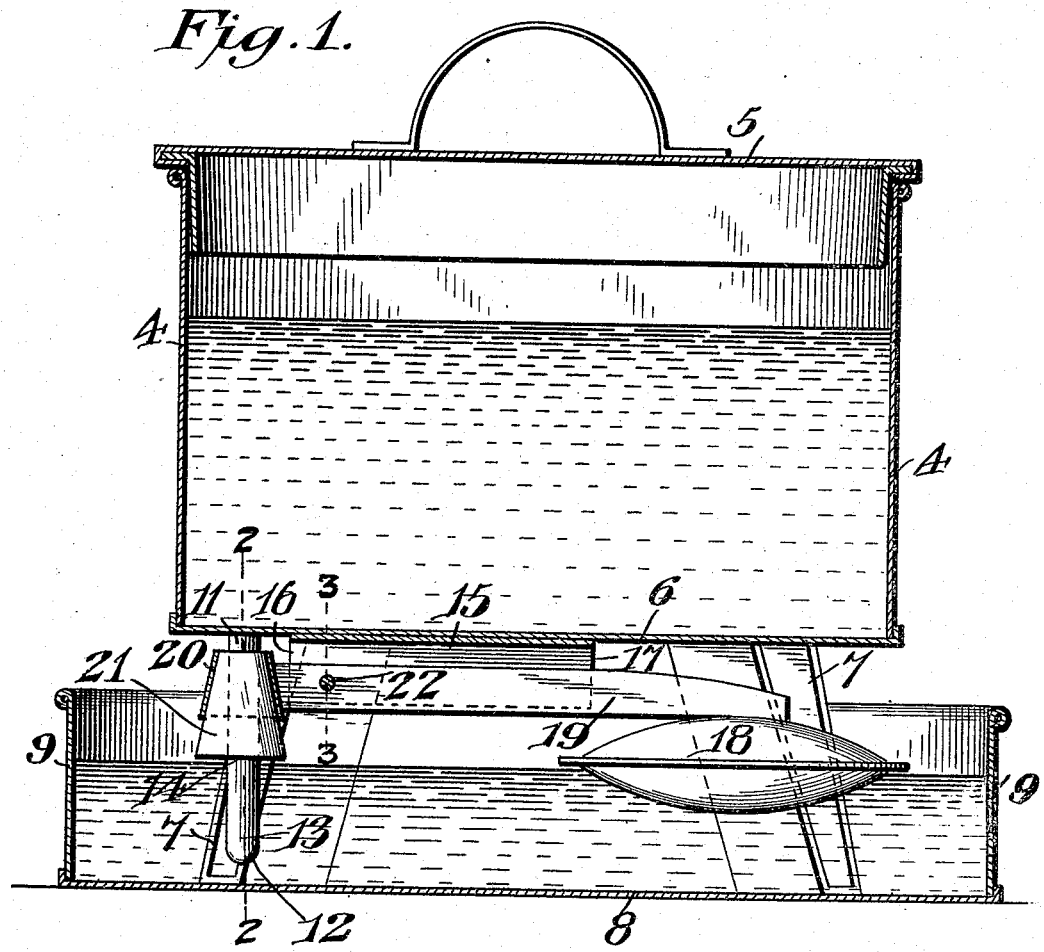
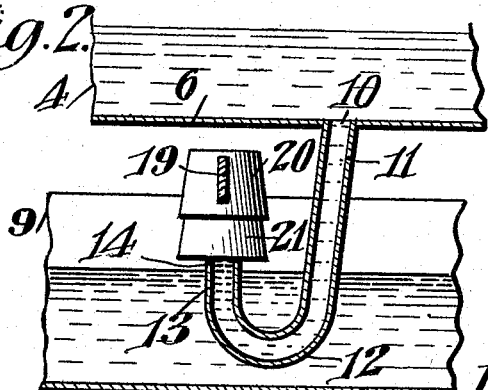
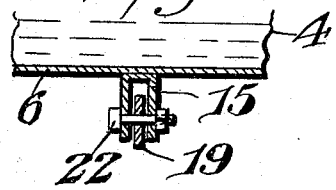
Witnesses
Jas. E. McCathran
George Tate
Isaac Baumgartner Inventor
By C. G. Biggers
Attorney

UNITED STATES PATENT OFFICE.

ISAAC BAUMGARTNER, OF LATHAM, KANSAS.

AUTOMATIC DRINKING-FOUNTAIN.

937,042.  Specification of Letters Patent.  Patented Oct. 19, 1909.

Application filed February 24, 1909. Serial No. 479,694.

*To all whom it may concern:*

Be it known that I, ISAAC BAUMGARTNER, a citizen of the United States, residing at Latham, in the county of Butler and State of Kansas, have invented a new and useful Automatic Drinking-Fountain, of which the following is a specification.

This invention relates to an improved automatic drinking fountain, and is especially adapted for fowls and the like.

The object of the invention is to provide a device of the character described, in which a novel float valve is provided.

The invention comprises a pan in which is arranged a water receptacle having suitable supporting legs secured thereto. The receptacle is provided with a water discharge pipe having an upturned end. A suitable guideway is secured to the bottom of the receptacle, and a lever of a float valve is pivotally secured within the guideway. The lever is provided with a shell for receiving a cork valve which is adapted to open and close the end of the discharge pipe whenever the depth of the water in the pan fluctuates.

In the drawings, Figure 1 is a vertical sectional view of the fountain; Fig. 2 is a detail sectional view of the discharge pipe, taken on the line 2—2 of Fig. 1; Fig. 3 is a detail sectional view taken on the line 3—3 of Fig. 1, and showing the float lever pivoted within the guideway.

Like reference numerals indicate corresponding parts throughout the several views of the drawing.

Referring to the drawing, 4 designates a water receptacle having a suitable cover 5, a bottom, 6, and suitable supporting legs 7, which are secured to said bottom and adapted to rest upon the bottom 8 of a pan or tank 9. An opening 10 is provided in the bottom 6 of the receptacle and near the periphery thereof. One end of a discharge pipe 11 is secured to the bottom of said receptacle and within the said opening. The pipe extends downwardly therefrom and comprises a curved portion 12, which is preferably located in close proximity to the bottom 8 of the pan 9, and a short upturned portion 13, the open end thereof which constitutes the discharge end of the pipe being located within the pan 9 but near the top thereof.

An inverted U-shaped guideway or support, 15, is secured to the bottom of the receptacle by solder or other suitable means, and is in alinement with the discharge end of the pipe. The outer end 16 of the guideway is spaced from and in rear of said discharge end 14 of the pipe 11, while the other end 17 is preferably located near the center of the bottom 6 of the receptacle.

The invention further comprises a float 18 of any desired construction, to which is rigidly secured one end of a lever 19. A conical shell 20, constituting a valve seat, is secured to the other end of the lever and is especially adapted to receive a tapered valve 21, which is preferably an ordinary bottle cork, although any other resilient material may be employed. The lever is arranged within the inverted U-shaped guideway and is pivotally secured thereto by a suitable bearing 22, which is located near the outer end, 16, of said guideway in order to give the greater leverage to the float 18.

The operation of the fountain will be readily understood from the following: The receptacle 4 is filled with water and is placed in the pan 9. The water will then flow from the discharge pipe 11 and into the pan 9 until the water reaches the float 18, which will then rise with the water until the valve 21 closes the discharge end 14 of the pipe 11. Then as the water in the pan is used, the float having the greater leverage, will raise the valve and more water will be discharged into the pan. Thus it will be apparent that whenever the depth of the water fluctuates, the discharge pipe will be automatically covered and uncovered by the float valve. By employing an ordinary cork for a valve, a positive closure for the discharge pipe is assured because of the fact that the resiliency of the cork will permit of the same to tightly engage the discharge end of the pipe. Furthermore, the cork can be easily taken out and another one inserted into the shell whenever desired. The employment of the guideway will always insure the proper position of the valve with respect to the discharge end. The fact that the cork exceeds in diameter the diameter of the discharge pipe and engages the outer end thereof are features of construction which are of prime importance in maintaining the efficiency of the apparatus.

From the foregoing, it is thought that the construction, operation and many advantages of the herein described invention will be apparent to those skilled in the art without further description, and it will be understood that various changes in the size, shape, proportions and minor details of construction may be resorted to without departing from the spirit or sacrificing any of the advantages of this invention.

Having thus described my invention, what I claim as new and desire to secure by Letters-Patent, is:

1. An automatic drinking fountain consisting of a pan, a water receptacle arranged within and above the bottom of the pan, a water discharge pipe depending from the bottom of the receptacle and provided with a short upturned discharge end, a guideway secured to the bottom of the receptacle, and a lever fulcrumed in the guideway and provided at one end with a valve and at the other end with a float which is adapted to cause the valve to cover and uncover the discharge end of the pipe, said valve engaging the extremity of the discharge end of the pipe and larger in diameter than said end.

2. An automatic drinking fountain consisting of a pan, a water receptacle arranged within and above the bottom of the pan, a water discharge pipe depending from the bottom of the receptacle and provided with a short upturned discharge end, a support secured to the bottom of the receptacle, and a lever fulcrumed to the support at a point near one end thereof, said lever being provided at the end of its short arm with a conical shell that is adapted to hold a tapered valve member of resilient material, and at the end of its long arm with a float which is adapted to cause the resilient valve to cover and uncover the discharge end of the pipe.

3. In combination with the water receptacle and pan, a discharge pipe from the receptacle having an upturned end, a lever having a float at one end and a conical shell at the other, a tapered valve having its large end adapted to bear upon and close the outer extremity of the said upturned end, said valve being larger in diameter than said upturned end.

In testimony, that I claim the foregoing as my own, I have hereto affixed my signature in the presence of two witnesses.

ISAAC BAUMGARTNER.

Witnesses:
 W. H. BROWN,
 WILLIAM LAMBERT.